United States Patent
Adelshin et al.

(10) Patent No.: US 7,392,796 B2
(45) Date of Patent: Jul. 1, 2008

(54) METHOD AND APPARATUS FOR OPERATING AN INTERNAL COMBUSTION ENGINE WITH AN ADELSHIN AGGREGATE PHASE THERMODYNAMIC CYCLE

(76) Inventors: Almir Vagisovich Adelshin, Menshikovski PR. 19-77, Saint-Petersburg (RU) 195273; Rinat Vagisovich Adelshin, Menshikovski PR. 19-77, Saint-Petersburg (RU) 195273

( * ) Notice: Subject to any disclaimer, the term of this patent is extended or adjusted under 35 U.S.C. 154(b) by 388 days.

(21) Appl. No.: 10/381,918
(22) PCT Filed: Aug. 17, 2001
(86) PCT No.: PCT/RU01/00352
§ 371 (c)(1),
(2), (4) Date: Jul. 24, 2003
(87) PCT Pub. No.: WO02/31328
PCT Pub. Date: Apr. 18, 2002

(65) Prior Publication Data
US 2004/0050038 A1    Mar. 18, 2004

(30) Foreign Application Priority Data
Oct. 9, 2000    (RU) .............................. 2000125872

(51) Int. Cl.
*F02B 47/08* (2006.01)
*F02B 47/10* (2006.01)
(52) U.S. Cl. .................... 123/568.11; 60/311
(58) Field of Classification Search ............ 123/568.11, 123/27 R, 323; 60/311, 323, 309
See application file for complete search history.

(56) References Cited

U.S. PATENT DOCUMENTS

| | | | | |
|---|---|---|---|---|
| 3,831,377 A * | 8/1974 | Morin | ........................ | 60/274 |
| 4,783,958 A * | 11/1988 | Borja | .......................... | 60/274 |
| 4,920,745 A * | 5/1990 | Gilbert | ......................... | 60/273 |
| 5,044,159 A * | 9/1991 | Landfahrer et al. | ........... | 60/314 |
| 5,078,631 A * | 1/1992 | Harbert | .................... | 440/89 R |
| 5,245,824 A | 9/1993 | Nouis | | |
| 6,134,885 A * | 10/2000 | Gilbertson | ................... | 60/312 |
| 6,698,194 B2 * | 3/2004 | Blair et al. | .................... | 60/314 |
| 6,732,508 B2 * | 5/2004 | Flach et al. | ................... | 60/312 |

FOREIGN PATENT DOCUMENTS

| | | |
|---|---|---|
| RU | 2055224 C1 | 2/1996 |
| RU | 2197622 C2 | 1/2003 |
| SU | 1377427 A1 | 3/1992 |
| WO | PCT/US91/05747 | 3/1992 |

* cited by examiner

*Primary Examiner*—Mahmoud Gimie
(74) *Attorney, Agent, or Firm*—Gary C Cohn PLLC (57) ABSTRACT

The invention relates to vehicle engines, in particular to improvements to the thermodynamic cycle that forms the operating method for an internal combustion engine. An aggregate-phase thermodynamic cycle consists in sequential and interrelated changes in the thermodynamic parameters of an exhaust gas as a working medium of an internal combustion engine, resulting from the energetic separation of the exhaust gases in a swirl chamber that is incorporated with the engine into a single thermodynamic system to form a single closed volume. The sequential creation of considerable high and low temperatures brings about aggregate-phase changes in the working medium. At the high temperature limit some or all of the exhaust gases are ionized. At the low temperature some or all of the exhaust gases are condensed in a closed volume. This in turn leads to the creation of a stable and considerable vacuum in this closed volume. This vacuum causes a positive working stroke in the operating cycle of the internal combustion engine.

15 Claims, 2 Drawing Sheets

METHOD AND APPARATUS FOR OPERATING AN INTERNAL COMBUSTION ENGINE WITH AN ADELSHIN AGGREGATE PHASE THERMODYNAMIC CYCLE

TECHNICAL FIELD

The invention relates to vehicle engines, in particular to improvements to the thermodynamic cycle that forms the operating method for an internal combustion engine, at the expense of special operational processes with the use of kinetic energy of exhaust gases, accompanying other operational processes of energetic separation in the swirl chamber, as a device of thermodynamic transformation and neutralization of exhaust gases.

BACKGROUND ART

A. Adelshin's internal combustion engine thermodynamic cycle without forced induction and an internal combustion engine operating on that cycle are well known and described in RU N 94037895 06 A1. It represents an extension of the thermodynamic cycle of S.Carnot. It is based on the fact that a vacuum is created in a collector behind the exhaust valve. The vacuum causes the accelerated discharge of the exhaust gases from the combustion chamber with creation of deep vacuum. The discharge results in the compulsory rise of the piston from position BDC to TDC, i.e. an additional useful operation for the rotation of crankshaft is produced. The cooling of cylinder walls and the intake of unheated and fresh charge is rapidly produced. The absence of exhaust residual gases in the combustion chamber raises the delivery ratio. The vacuum is created at the expense of the discharge of the exhaust gases with supersonic speeds determined by passing them through a supersonic nozzle.

To the lacks of the given operating method, it is possible to attribute an imperfection concerning an aggregative state of a working medium depending on modes of operation and appropriate basic thermodynamic parameters, and complexity of creation of a steady state of vacuum with the help of the engine specified in the given application.

Another internal combustion engine is described in RU N 2055224 C1. The engine contains a case with a cylinder-piston group, devices to exchange gases, and an exhaust manifold supplied by a swirl ejector and additional gas exchange devices such as exhaust valves connected by a pipeline with a passive nozzle of a swirl ejector, an active nozzle of which is connected to the exhaust manifold. As a result, the cylinders of the engine are connected through the exhaust values to a source of discharge such as a swirl ejector. In addition, the exhaust valves are connected by a pipeline with the paraxial mixing zone of a swirl ejector chamber. In addition, the installation of the swirl ejector between the engine radiative cooler and the engine provides the intake of environment by the ejector through the cooler and cools the heat-carrier in this system.

The offered engineering solution has new properties—the ability to remove the exhaust gases from the cylinder before fresh combustion gases are introduced preventing the induction and exhaust valves from overlapping, elimination of cylinder air purge, faster removal of exhaust gases from and faster introduction of gases to the cylinder, reduced work needed for the removal of exhaust gases from the cylinder, greater work output during the expansion step, more complete removal of exhaust gases from the cylinder volume, improvement in the engine's ecological characteristics, noise reduction and use of the swirl ejector for engine cooling, increased engine capacity, performance and efficiency and also a reduction in toxic substances that are emitted into environment.

To the lacks of the given engine, it is necessary to attribute the complexity of the swirl ejector transition, as a basic operational medium of the system, to the constant auto modeling mode at ICE cyclic exhaust. In addition, the aggregative state of working medium and its basic thermodynamic characteristics are not determined. Because, of this at operation of a real ICE, a number of distinctive positive results, probably, are difficult to achieve.

DISCLOSURE OF INVENTION

The purpose of the invention is to increase the efficiency of an ICE, to improve its operation and its ecological characteristics.

The specified technical effect, according to the invention, is achieved due to the fact that the operating method of the internal combustion engine, which represents a closed thermodynamic cycle containing cycles of isochoric, isobaric heat input of supply during combustion of a fuel-air mix, adiabatic expansion of the burned down gases, isochoric removal of heat at the moment of their exhaust from the engine and adiabatic compression of a new fresh charge is modified by combining the internal combustion engine with a swirl energetic separation chamber to form a single interdependent thermodynamic system with a single closed volume, wherein the exhaust gases are discharged in the swirl chamber where the gas flow is separated into a cold paraxial flow with low pressure and a hot swirling flow with high pressure in which exhaust gases are heated up and make irreversible physical-chemical transformations wherein chemical components of the exhaust gases undergo an aggregative-phase transition, then compensating and cooling the hot swirling flow through contact with the cold paraxial flow with transformation of common thermodynamic and physical—chemical parameters of exhaust gases wherein an aggregative—phase transition of its chemical components into a state of liquid occurs, subsequently removing the liquid in a drainage, and producing a vacuum in the closed volume of the single thermodynamic system to produce an additional positive power stroke in the expansion chamber of the internal combustion engine, as a vacuum engine.

In another embodiment the aggregative-phase transition of the chemical of the exhaust gases is carried out in a state of ionized gas.

In another embodiment the exhaust gases are heated up with partial ionization of their chemical components.

In another embodiment the exhaust gases are cooled with partial condensation of their chemical components.

To achieve this technical effect, with reference to the known the level of engineering pertaining to an internal combustion engine design, volumetric expansion chamber of the internal combustion engine communicates with the swirl energetic separation chamber, such that the volumetric expansion chamber of the engine and the swirl energetic separation chamber form a single closed volume having common interdependent thermodynamic parameters so that a vacuum is created in it.

In another embodiment the internal combustion engine is supplied with a drainage system for removal of the condensed exhaust gases.

In another embodiment the internal combustion engine is in addition supplied with system for removal of a non-condensed gas portion of the exhaust gases.

In another embodiment the engine contains serially installed swirl energetic separation chambers, that form an interdependent thermodynamic system with the engine.

In another embodiment the engine contains parallel installed swirl energetic separation chambers, that form an interdependent thermodynamic system with the engine.

The specified components are essential and interconnected among themselves to form a steady set of essential parameters which achieve the specified technical effect.

In order to explain the cyclic thermodynamic process of the invention, it is necessary to define various parameters and how they interrelate. So the basic thermodynamic parameters for the certain working medium (gas), are temperature, volume and pressure. Temperature characterizes a thermal state of the medium. Heat can spontaneously transit only from a hotter body to a colder one. Thus, the temperatures of the bodies determine the direction of spontaneous heat transfer between the bodies. The absolute pressure represents the force acting perpendicularly on a surface of the medium per unit of surface area. The specific volume of a substance represents the volume occupied by a unit of mass of the substance.

In the absence of external influences on the system, the state of a pure substance is unequivocally determined if two independent parameters are specified. Any other parameter is an unequivocal function of the two given parameters. For each substance, the functional connection between pressure, volume and temperature is unique. Any three state parameters are unequivocally connected among themselves.

If even one of the state parameters varies there is a thermodynamic process, representing a set of varied system states. The process is referred to as a non-equilibrium process, during which the system is not in equilibrium (i.e. the various parts of the system have various temperatures, pressure, density, concentration etc.). Any real process is to a greater or lesser extent a non-equilibrium process.

Isoprocesses are thermodynamic processes, that occur in a system with constant weight with one of parameters of the system state being held constant. Isochoric thermodynamic processes, proceed at constant system volume. The Charles law describes Isochoric processes for an ideal gas: at a constant volume the pressure of the given weight of gas is directly proportional to its absolute temperature. An isobaric process proceeds at constant pressure. For an isobaric process with an ideal gas the Gey-Lussac law of combining volumes applies: at a constant pressure the volume of a given weight of gas is directly proportional to its absolute temperature. Isothermal thermodynamic processes proceed at a constant temperature. An isothermal process with an ideal gas obeys Boyle's law: for a given weight of gas at a constant temperature the product of the numerical values of pressure and volume is a constant value. An adiabatic thermodynamic process is carried out in the system without exchanging heat with an external body.

It is known from technical thermodynamics, that substances usually stay in one of three basic aggregative states: gas, liquid or solid. Also there is the fourth state—ionized gas, or plasma. It is obvious, that one and the same substance under different conditions can exist in various aggregative states, depending on the basic thermodynamic parameters, which are absolute temperature, absolute pressure and specific volume (density) of a substance.

A process that proceeds with the expense of heat and a change in the volume and aggregative state of a substance, is referred to as a phase transitional process. By the aggregative state of a substance, the gas, liquid and solid states are usually meant. The substance has different physical properties, particularly density, in the various aggregative states. This distinction is explained by the character of intermolecular interaction. The following classification of phase transition points is accepted: the temperature at which a substance changes from a liquid to a vapor is referred to as a boiling-point (which is also the condensation point), the temperature at which a substance changes form a solid to a liquid is referred to as a melting-point (which is also the freezing point), and the temperature at which a substance changes from a solid to a gas is referred to as the sublimation point.

Thus, at an appropriate ratio of pressure and temperature a given quantity of an ICE working medium can take the form of a solid, liquid or a weakly ionized gas. With significant heating a gas can dissociate with the subsequent disintegration of intermolecular bonds to ionize. This can occur at significant temperatures and pressures. Generally, for an ICE working medium it is at most possible to undergo the aggregative-phase transition from a gas—weakly ionized gas. This phase transition is accompanied by significant physical-chemical irreversible transformations of the exhaust gas.

For example, in the course of cooling a given weight of a working medium there is an aggregative phase transition from liquid to vapor, i.e. condensation. The condensation is possible at a certain ratio of temperature and pressure and accordingly for a certain molar weight of gas results in significant reduction of its specific volume (density). This in turn causes a significant reduction of pressure in some total volume of thermodynamic system. Cooling up to solid state is also possible but taking into account, that liquids are difficult to compress, and water, for example, in general increases its volume during transition to ice, forming solids is of little benefit to the offered operating method.

Thus, the physical essence of the offered operating method consists in the fact, that in some parametrally determined closed (or conditionally closed) thermodynamic volume V, during cooling up to some temperature T with some pressure p, and some conditional gas weight m, the working thermodynamic medium condenses. There is a thermodynamic phase transition of the working medium from a gas to a liquid accompanied by a change of heat of thermodynamic system and significant reduction of the specific volume (density) of the working medium. This results in a significant reduction of pressure in the given parametral thermodynamic volume to form a steady vacuum. And if the expansion chamber is structurally attached it is capable of producing a positive power stroke, and operate as a vacuum engine.

Therefore, the given physical effect, according to the invention, is achieved by the use of the method of consecutive cyclic transformation of ICE exhaust gases (ICE working medium), and its thermodynamic parameters, as a result of its energetic separation in swirl energetic separation chambers on the basis of the Ranque effect. Structurally it is achieved by the use of the swirl energetic separation chamber together with an ICE in the single thermodynamic system, with interdependent thermodynamic parameters. Such interdependent thermodynamic parameters of the ICE working medium and the ICE parameters achieve a new qualitative effect—the energetic separation of a gas ICE working medium. It is necessary to understand, that the achievement of the declared technical result is possible only at the appropriate parameters and operational adjustments of the given single thermodynamic system. Thermodynamic design values of a single thermodynamic system are uniquely defined for each technical embodiment. The energetic separation of exhaust gas, compensation of flows, their cooling, condensation and creation of a vacuum in a single volume, occur sequentially in order to achieve the best result.

In order to explain the physical nature of the basic operational effect, it is necessary to explain effect, or the Ranque effect. The Ranque effect represents a complex gas-dynamic process that occurs in a spatial swirling flow of viscous compressed gas.

Based on experimental data, it is possible to state the essence of the Ranque effect as follows. The compressed gas following through a tangential nozzle in a smooth pipe with a large speed forms an intensive whirlwind. Under the action of centrifugal forces particles of gas cannot move to the center of the pipe, they are moving rotating near the walls and pass to atmosphere through the valve. At the center of the rotating gas a vacuum is formed and the air flows in from the atmosphere through the diaphragm. If one starts to close the valve, the pressure inside the pipe will raise, the inflow of atmospheric air is stopped. During the further closure of the valve a part of the gas flow in front of the valve "will pass to the smaller radius", moving to diaphragm and discharging to the atmosphere through it. During transition from "the greater radius to the smaller one", according to the law of conservation of momentum, the peripheral speed should increase so that its product by radius remains constant: Vqr=const.

Thus, the closer the gas flow moves to the center of a pipe, the larger speed it will have. As a real gas possesses viscosity, every flow will inhibit the next one closer to the center and take energy away from it. As a result in a swirling flow there will be a transfer of energy from the axis to the periphery, therefore the energy of peripheral layers of gas will grow, and the energy of the axial layers will fall. After transfer of this energy, the axial layers of gas begin to rotate almost like a solid. At the same time because of decrease of the flow's static temperature in the direction of the axis the transfer of heat by thermal conductance of gas will be observed. The transfer of energy from axial layers of gas to peripheral ones occurs along some length of a pipe. The more energy that needs to be taken away from axial layers of gas, the longer the length of the swirling zone of the pipe should be, according to V. I. Kuznetsov, "Optimization of Parameters of Swirl Pipe and Methods of its Computation", Leningrad, LTIPH, 1001, pp. 10-11.

Therefore, as a result, during the energetic separation of gas in a swirling flow it undergoes irreversible physical-chemical transformations as a result of the influence of high temperatures increased pressure and volume in the zone of the swirling flow.

To further explain, it is necessary to determine what the ICE working medium is. Essentially it is a mixture of gases. Thus according to Dalton's law, each separate gas in a gas mixture behaves as if it occupies all the volume of the mix by itself at the temperature of the mix. In other words, each separate gas included in a gas mix, possesses such pressure that it would have if it occupied all the volume of a gas mixture by itself. This pressure is referred to as the partial pressure.

The ICE exhaust gases, as a working medium, are a complex non-stationary physical-chemical system that changes dynamically in time. At the current level of engineering development the precise physical-mathematical model for calculating the dynamics of expansion in the given thermodynamic system does not exist, and in practice, in the design of discharge systems and mufflers, empirical methods are applied starting from design requirements, as a rule. In this connection, a simplified physical-chemical model of a working medium, and thermodynamic cycle derived from the achieved research level is stated.

The basic products of combustion in ICE are water vapor and carbon dioxide. They are products of complete combustion and constitute the most significant portion of the volume. Therefore, the chemical-thermodynamic transformations they undergo are most important for the achievement of the aggregative-phase thermodynamic cycle of the invention.

Also, in addition to the products of complete combustion—water carbon dioxide and water vapor, ICE exhaust gases contain toxic substances. They are products of incomplete combustion of fuel: carbon monoxide CO, hydrocarbons of various structure having the form CH, which include vapors of non-burned down fuel and soot, and also nitric oxides of air NOx, which are formed at high temperatures during combustion.

Carbon monoxide CO is formed by burning a rich mixture due to the lack of enough oxygen to completely oxidize the fuel. The formation of hydrocarbons CH is connected to slowing of and even by the complete termination of reactions of oxidation of the fuel-air mixture at a thin wall layer in the combustion chamber. Intensive heat dissipation from gas to the walls reduces the speed of burning so that the fuel has no time to burn down. Nitrogen, chemically inert under atmospheric conditions, at high temperature reacts with oxygen. The reaction occurs rather quickly at a temperature more than 2300 K, and generally, nitric oxygen is formed. In atmospheric air, there is a slow oxidation of NO to nitrogen dioxide $NO_2$ the toxicity of which is much higher than the toxicity of NO.

The reactions of fuel oxidation are known. The ratio between the quantity of initial products (fuel plus air) and products of combustion can be found from the equations of chemical reactions based on the following assumptions: all chemical compounds consist of atoms of separate elements bound among themselves in certain numerical ratios; during chemical reactions the atoms keep individuality and only their regrouping occurs.

The complete oxidation (combustion) of a molecule of $C_xH_y$ up to the final products (carbon dioxide $CO_2$ and water vapor $H_2O$) is described by the equation (the reaction initial data and final products are given in kilomoles):

$$C_xH_y + (x+y/4)O_2 = xCO_2 + y/2 H_2O.$$

The minimal quantity of oxygen kilomoles Lo, necessary for complete fuel combustion and determined on the basis of the given equation, is referred to as the stoichiometric quantity.

If the quantity of oxygen is less than stoichiometric, the oxidation will be incomplete. At incomplete oxidation (combustion), a part of carbon is oxidized only up to CO (carbon monoxide) and a part of hydrogen does not burn down at all.

With the reduction of the quantity of oxygen in the fuel-air mix, the contents of CO and $H_2$ in the products of combustion will be increased and the contents of $H_2O$ and $CO_2$ will decrease. With a share of carbon, oxidized up to CO, equal to a share of the unburned hydrogen in products of combustion will contain only carbonic oxide CO and unburned hydrogen $H_2$.

The volumes of initial components and products of combustion can differ because of the difference of number of kmoles of the fresh charge M1 and the products of combustion M2.

In complete combustion an increase in the of number of kmoles of gases and an increase of volume of combustion products occurs because of oxidation of hydrogen and formation of two molecules of $H_2O$ from one molecule $O_2$ (see equation). In incomplete combustion, the increase in volume is larger, as besides oxidation of $H_2$ in $H_2O$ (one molecule $O_2$—two molecules of $H_2O$) incomplete oxidation of C to CO occurs (one molecule $O_2$—two molecules CO).

For the realization of an operational cycle the essential properties of fuels are combustion and evaporation value, heat capacity, thermal conductance etc. Combustion value is the most important among them. The burning of fuel concerns is an exothermic reaction, i.e. goes with calorification. Combustion value is a thermal effect of reactions that form $CO_2$ and $H_2O$. As water in the combustion products can be in the vaporous or liquid state accordingly minimum and maximum combustion value are possible, the difference between them being equal to the latent heat of water evaporation; $Ni=Nv-2,512\ M\ H_2O$.

In reciprocating ICE and gas turbines the combustion products are not cooled up to temperature at which a condensation of water vapor occurs, therefore in calculations the lowest combustion value (Ni) is accepted.

In engines with external carburetion there is a surplus of air so oxidation of fuel up to CO practically never takes place and carbon is absent from the products of combustion. In diesel engines the state of carburetion is such that there are zones where the given surplus of air is greater and during combustion, unburned carbon can be formed.

In addition, at high temperatures the products of combustion are decomposed to more simple components. This process refers to as thermal dissociation; it occurs with absorption of heat.

For example, the dissociation of $CO_2$ and $H_2O$ is described as follows:

$$2CO_2 = =2CO+O_2 2H_2O= =2H_2+O_2$$

The heat of dissociation comes back (recombination) when the temperature decreases along the line of expansion.

The preceding example of chemical interaction is simplified. A number of other products of combustion (nitric and sulfuric oxides, unburned hydrocarbons, plumbic ochre etc.) exist; they are not taken into account in power calculations but render essential influence on the ecological characteristics. Thus, the elimination of the given harmful products of combustion is possible in the process of thermal transformation in a zone of a whirlwind that produces ionization and subsequent recombination.

Also, at a sufficiently high temperature when the energy of thermal movement of atoms (molecules) is great, they can ionize each other at the expense of kinetic energy of colliding particles and a thermal ionization takes place. These processes are significant above temperatures ~1000-10000 K, for example in arc discharge, shock waves, in the atmospheres of stars. The degree of thermal ionization of a gas as a function of its temperature and pressure is estimated by the Saha formula for weakly ionized gas in a state of thermodynamic balance.

The process opposite to ionization is a recombination of ions and electrons—the formation of neutral atoms and molecules from them. Gas, protected from external influences, at ambient temperatures recombines very quickly and passes to a state in which the degree of its ionization is negligbly small. Therefore, the maintenance of appreciable ionization in gas is possible only at the action of external ionizing forces (flows of particles of photons, heating to high temperature). As the degree of ionization increases, the ionized gas forms a plasma sharply distinguished in properties from those of a gas of neutral particles.

At high temperatures in a monatomic gas a process of thermal ionization occurs—electron detachment from the external electronic environment of the atom. Because of this process a mixture of negatively charged electrons, positively charged ions and electrically neutral atoms is formed. This mixture of electrically charged and neutral particles is electro conductive. The structure of this mixture is determined by the pressure and temperature of the mixture. It is necessary to understand, that the ionization processes occur only in the initial zone of a whirlwind and last for a small period of time before recombination and condensation occur. Therefore, such temperatures have insignificant effect on the parts of an ICE.

In addition, it is necessary to note, that gases passing through the swirl nozzle of the swirl chamber undergo significant changes. So, the creation of a supersonic flow in the narrowed channel of the swirl nozzle is accompanied by orificing, a number of condensation steps occur inside the channel, which cause significant changes in thermodynamic parameters of a working medium.

According to the invention, boundary temperature states also exist. Therefore, in one embodiment of the operating method the temperature is sufficient to ionization of only some of the chemical components of the gas. This mode is thermally transitive, and in the designed thermodynamic system including the ICE and swirl chamber can arise only in certain operating modes, for example at preheating. In another possible operating mode, the heating is carried out without ionization. These operating modes are modes of particular technical embodiment of engine manufacturing. They can be both transitive during its operation, and independent operational modes for a particular embodiment of an ICE. At the same time, it is necessary to take into account that the physical-chemical processes of transforming the exhaust gas can occur in each mode with some deviations. That is, for the same reaction of chemical components of an ICE working medium, the state of balance of chemical reaction depends on a number of conditions, and first of all from temperature.

Thus, during significant heating of an working medium in the whirlwind zone of the swirl energetic separation chamber, chemical components of a gas mixture undergo significant irreversible thermo chemical oxidizing reactions, dissociation and ionization reactions, accompanied by significant physical-chemical changes of ICE exhaust gases, which are the working medium of common thermodynamic system.

Because of this, in the high temperature zone, the basic physical-chemical and thermodynamic parameters of the exhaust gas, as a basic ICE working medium, is changed.

Then, as a result of this, in the paraxial zone of the swirl energetic separation chamber a paraxial flow arises, having low temperature and pressure. As the swirling flow expands, its motion is slowed by the paraxial flow, accompanied by their mutual compensation and alignment of their general thermodynamic parameters. The flows are compensated and the common working medium is cooled.

It is necessary to note, that the axial, central flow is formed as a result of a complex gas-dynamic separation effect in the swirl chamber. Initially this flow has a considerably smaller pressure than atmospheric one. It has a considerably lower temperature, up to the area of temperatures close to absolute zero on the Kelvin scale.

So it is known, that the cycles of swirl pipes are, as a rule, separated, i.e. the process of compression of a working medium is separated from the process of temperature division, as a result of which the cold flow used for the purposes of cooling is formed.

The process of temperature division of air in a swirl pipe (see fig. V-9 of "Refrigerating Machines", from the series "Refrigerating Engineering", I. M. Kalnin, ed., Moscow, Light and Food-Processing Industry, 1982) can be summarily represented in an S-T diagram;

1—point describing an initial state of air before nozzle at temperature T=T o.cp. and pressure p;

2 and 3—points describing a state of cold and hot air after process of division in a swirl pipe;

4—point describing a state of air inflow in the compressor.

The cycle described in "Refrigerating Machines" consists of processes 1-2 and 1-3, proceeding simultaneously in a swirl pipe, isobaric processes 2-4 and 3-4 and process of compression 4-1 in the isothermal compressor. At adiabatic compression in the compressor instead of process 4-1 it is necessary to consider processes 4-5 and 5-1.

The flow of air, acting tangentially to an internal surface of a pipe, makes a rotary movement in relation to an axis of a pipe. The peripheral part of the formed swirling flow moves along the hot end 3 (see fig. V-10 of "Refrigerating Machines") to chocker 4, where the part of a flow is removed from a pipe on a ring-shaped nozzle at temperature Tr. The other part of the air flow moves along the central part of a pipe counter to a peripheral flow and is removed through a diaphragm aperture at temperature Tx. Power exchange between the central and peripheral parts of a swirling flow is characterized by essential irreversibility, therefore the process of expansion of a cold flow of air is not represented by isentropic curve (1-2', see fig. V-1), but irreversible polytrope 1-2)".

Thus, complex irreversible processes occur inside the swirl energetic separation chamber. Moreover, the essential thermodynamic importance of the swirl chamber is that the process exhaust, as a rule, is also cyclic due to the cyclic operation of the ICE. That is, the working medium has the precisely certain individual parameters of weight, temperature, pressure etc., and all possible transformations for the given unit of a working medium occur in one cycle. For this cycle with a given working medium, sequential changes are made which are irreversible and transform the working medium.

It is necessary to note that the swirl energetic separation chamber used in the cyclic type of engine described is self-vacuumizing, in the simplest embodiment i.e., of the type used to produce minimal temperatures inside the pipe and operating, as a rule, without a cold flow tap (self-vacuumizing swirl pipes, where M=0). Also it is necessary to understand, that the most well-known and studied swirl energetic separation chambers are refrigeration devices, in which compressed air is constantly supplied at constant pressure and which is self-modulating. In refrigeration engineering, there are some hypotheses concerning the swirl effect and some physical and mathematical models of swirl energetic separation chambers have been calculated. In this case, the ICE working medium differs considerably in its physical-chemical parameters from compressed air. In addition, the swirl energetic separation chamber operates in a complex and little-studied mode. That operating method is a cyclic self-vacuumizing self-modulating mode. Therefore, in view of absence of theoretical bases and physical and mathematical model of the given process, it can be presented in the simplified alternative as follows.

At the beginning, there is a process of creation of a swirling flow. So, proceeding from a piston-type ICE, the exhaust gas discharges with subcritical speeds (600-800 M/S) into the swirl nozzle of the chamber, where is injected and warmed up. Thus, its basic thermodynamic parameters change, in particular temperature and speed of the discharge. Hypersonic gas flow may exist in a primary zone of a whirlwind. Actually, in this zone significant warming up of ICE working medium is also carried out. Further, having formed a whirlwind and intensively rotating along the walls of the chamber, the given portion of gas moves down through the chamber and loses speed, temperature and pressure. Eventually, all (or nearly all) the exhaust gas from the cylinder gets in the swirl chamber. That is, all the weight of gas, for a particular individual cycle of exhaust, is discharged from the cylinder. There is some under pressure in the cylinder, because of wave process of the discharge. Thus, the there is no further discharge of gas from the cylinder. A portion of gas inside the swirl chamber is no longer being pushed by anything, but its flow continues for some period of time. During this temporary period, a paraxial flow having a low temperature and low pressure down to a significant already exists in paraxial zone. Further, there is a process, at which, the vacuum produced by the given paraxial flow will simultaneously penetrate into the cylinder, and simultaneously inhibit the swirling flow. Figuratively, it operates as though it is sucking the swirling flow back. As a result of this, the swirling flow is completely stopped and compensated, i.e. pressure and temperature of flows are leveled in a single volume. As a result of this, the working medium of a certain individual operational cycle, which has a certain molar weight, in a certain total volume of the common thermodynamic system, again acquires some uniform condition of temperature and pressure. So, proceeding from the available scientific understanding, it is possible to explain approximately the given complex thermodynamic process by which pressure and temperature become aligned in the common thermodynamic volume of the swirl chamber and ICE expansion zone. Thus, all sequential processes occur very quickly in time. This swirling thermodynamic process is dynamic in time, complex and non-stationary in physical-chemical model. Part of this process occurs in a single closed volume, i.e. as an isochoric process. In addition, in another stage, the process proceeds with the alignment of pressure, i.e. as an isobaric process.

The given process has not been studied thoroughly at the engineering level. At the same time, it is possible to say that in a cyclic self-vacuumizing swirl chamber of energetic separation chamber a process of mutual compensation of thermodynamic parameters of exhaust gas occurs in a swirling flow under the influence of a paraxial flow.

Therefore, because the mutual compensation of flows a quick and significant cooling of ICE working medium is achieved. As a result of this the ICE working medium undergoes thermodynamic processes, connected to the influence of low temperatures at certain pressure with the condensation of ICE exhaust gases, or a part of their chemical components. The condensation, as a process of transition of substance from gaseous state to the liquid one, is accompanied by release of heat and a change of specific volume. The latter circumstance ensures the best use of the heat when the vapor formed by burning the fuel condenses, i.e. passes the dew point. This is a consequence of the significant and quick cooling because of the energetic separation of flows in the swirl energetic separation chamber.

So, any substance can transfer into a gaseous state by appropriate selection of pressure p and temperature T. Therefore, the possible area of existence of a gaseous state is graphically convenient for representing in variables p-T (in p-T diagram, FIG. 1 of "Physical Encyclopaedic Dictionary, Moscow, Soviet Encyclopedia, 1984). When T is below the critical Tc, this area is limited by curves of sublimation (subliming) 1 and vaporization 2. This means, that with any p below critical per there is temperature T, determined by the curve of sublimation or vaporization, above which the substance becomes gaseous. At temperatures below the temperature of a threefold point Tp the gas can be in equilibrium with the solid substance (on curve 1), and between a threefold point Tp and critical point K—with a liquid phase. Gas in these states is usually referred to as a vapor of the substance.

At T below Tc it is possible to condense gas—to transfer it into another aggregative state (solid or liquid), for example by raising pressure.

At T>Tc the border of gaseous area is conditional, as at these temperatures phase transformations do not occur. Sometimes for conditional border between gas and liquid at supercritical T and p the critical isochor of substance (FIG. 1) is accepted, in the immediate proximity from which the properties of substance change, though not stepwise, but especially quickly.

Owing to the fact that the area of the gas state is very extensive, gas properties with the change of T and p can vary over a wide range.

It is necessary to define: "the amount of heat, which is necessary to impart at the constant pressure of 1 kg of a liquid heated up to the temperature of boiling for its transformation in dry saturated vapor, refers to as the latent heat vaporization or simply heat vaporization.

In inverse process, which refers to as condensation, dry saturated vapor at the beginning becomes damp, and then completely turns into a liquid.

For the transformation of 1 kg of dry saturated vapor into a boiling liquid of the same pressure from it is necessary to extract heat equal to heat vaporization.

Thus, the extraction of the heat of vaporization from an ICE working medium produces additional opportunities to increase the thermal efficiency of an ICE. In addition, as a thermal process it is accompanied by a change of specific volume (density) of a working medium and creation of a vacuum in the common thermodynamic volume.

As was mentioned above, in the normal course of process of burning, at the normal stoichiometric composition of a fuel-air mixture (FAM), the most volumetrically significant parts of ICE exhaust gases are water vapor and carbon dioxide. In this connection, it is necessary to consider the processes of their condensation in a closed volume.

It is necessary to note that water, as a working medium of thermal and refrigerating machines, is widely applied in engineering. The density of water vapor is many times less than the density of water (at the temperature of 373° K, for example, 1600 times less dense). The thermodynamic properties of water and water vapor are interconnected, and at some ratio of pressure and temperature in the given volume, the isobaric process of heat extraction from damp vapor is possible, which results in condensation (transition of a dew point). Such heat extraction in practice simultaneously represents an isothermal process too. The given process is easily feasible, and represents a process similar to the process of vapor condensation of water in steam plants. Plants operating the Carnot cycle, Renkin cycle and regenerative cycle operate this way so they are known from an engineering standpoint.

Concerning carbon dioxide, it is possible to demonstrate an opportunity of condensation. The dependence connecting volume V and pressure p for carbonic acid at temperature T=20 C is shown in FIGS. 6-10 of Kirillin et al, "Technical Thermodynamics", Moscow, Science, 1979. The specific volume of carbonic acid at a temperature of 20° C. and pressure 98 kPa (1 kg/cm$^2$) is equal to 561.8 cm$^2$/g. During compression the specific volume strongly decreases. After the pressure becomes equal to 5733 kPa (58.46 kg/cm$^2$), i.e. the pressure of saturation of carbonic acid at 20° C. (point 2), the process of condensation of carbonic gas begins; thus the specific volume of carbonic gas V=5.258 cm$^3$/g. As is known (see 5-5.), this isothermal process is at the same time isobaric, therefore the isotherm sector, corresponding to phase transition appears horizontally in the p-V diagram. After the process of condensation is finished, the specific volume of the saturated liquid (point 3) V will be equal to 1,258 cm$^3$/g. At the further compression of a liquid phase its volume changes less, as it was already mentioned above; for example, at the pressure of 9807 kPa (100 kg/cm$^2$) the specific volume of liquid carbonic acid V is 1.18 cm$^3$/g (point 4).

As the pressure on a liquid is reduced, the substance will pass through the same states in the reverse order; it will expand up to the point of boiling, there will be evaporation, and then the obtained vapor will expand until it reaches atmospheric pressure.

As can be seen under such parameters of pressure and temperature, the specific volume of carbonic gas decreases approximately 470 times. Certainly, the given example is only of one set of conditions, and in an actual operating process for a given ICE, other parameters of pressure and temperature will exist. At the same time, it is clear enough that at some range of thermodynamic conditions in the closed volume of a single thermodynamic system defined by the ICE and the swirl chamber, is possible to condense the carbon dioxide component of the exhaust gas. Thus, taking into account a significant change of the specific volume of gas within the closed volume of the common thermodynamic system, it is possible to obtain a significant and steady vacuum.

In the refrigeration industry, working devices for cooling and condensing combustion products are widespread. For example, it is known that similar thermodynamic transformations of a working medium which is similar in chemical structure, are carried out in heat and cooling power machines (HCPM), consisting of, in combined form: of an ICE, as the gas turbine, complex incorporated system of boiler, economizers, sources of water supply, pumps, generators, turbine expanders, separators etc. Thus, the coproduction of heat, electrical energy and carbonic acid (i.e CO is processed up to a solid state). In the considered machine the combined cycle consists of two straight lines—the cycle of gas-turbine unit (cycle of a gas step) and a cycle of steam-turbine unit (cycle of a steam step) and one reverse (refrigerating cycle), similar to the cycle of the gas-refrigerating machine. That permits one to achieve the maximum calorific efficiency of fuel, the absence of heat loss with discharge gases, and the transformation of combustion products into a refrigerant and production of solid carbon dioxide by freezing it out from the products of combustion.

Thus, from the level of engineering the offered thermodynamic process of cooling and condensation of ICE products of combustion is known, mastered, and widely applied in refrigerating engineering. However, it is achieved by more complex stationary systems and is focused on other results.

It is also possible for chemical components of the exhaust gases to dissolve in the condensed part of the exhaust gasses in a physical-chemical process. From the general level of physical chemistry, the following is known.

It is known that "the state of equilibrium between a binary (bicomponent) solution and one of its components, composing a separate phase, exists widely in real systems and is well studied. The given equilibrium characterizes the major physical-chemical property of substances—solubility. It is obvious, that both the single-component phase (pure component) and the binary solution can be gaseous, liquid or solid. Typical examples of binary solution-pure component equilibria are the saturated solution of a solid in a liquid, which is in equilibrium with the given solid, and solutions of a gas in a liquid or in a solid which are in equilibrium with the given gas. Obviously, the solubility of gases in solid and liquid substances depends on both temperature and pressure. It is simultaneously necessary to take into account, that when contacting these two condensed phases the mutual solubility of components (especially in liquid-liquid systems) is possible, therefore the equilibrium may not be between a pure component and a solution, but between two solutions: the first component in the second and the second component in the first.

Thus, the dissolution of one chemical component of the engine exhaust gases in another is possible. At the same time, the components can possess different physical-chemical parameters, both for chemical activity, and aggregative state. The dissolution of carbon dioxide component of exhaust gases in the water component with the formation of a solution of carbonic acid is possible. The same is possible, for example, at a primary volumetric condensation of the water component of the exhaust gases. It is determined by operational control of the swirl energetic separation chambers. That is, if the primary chamber is adjusted exclusively for the primary condensation of a water component of exhaust gases water, which is in a liquid state, acts as absorbent. Moreover, the gases, being in vaporous state, act as coolants. The given process is transient and also has the nature of a volumetric process, or of a volumetric-wave in the closed volume of the swirl chamber and ICE. Thus, this process of absorption occurs with heat extraction. In this connection, it is necessary to understand, that the process of condensation itself consists of a number of accompanying sequential processes. These processes are poorly studied at the given stage of research. They occur at the same time and as and are defined as the integral accompanying processes, connected to condensation. Further, they are generally described as condensation.

Other components of exhaust gases, for example nitrogen compounds, form an insignificant share of the exhaust products and are compensated as a result of the overall process of transforming the exhaust gases in the high and low temperature zones.

One of the embodiments of the invention, in which the swirl energetic separation chambers are installed serially, one after another, provides the opportunity of adjusting their thermodynamic parameters such that, for example, the first one is adjusted exclusively for carbon dioxide component and the second one for the steam-water component, or vice versa.

It is also necessary to understand, that the swirl chamber should be adjusted for thermodynamic parameters which will effectively condense the largest part of ICE exhaust gases in each cycle. To increase the productivity of the swirl chamber, in another embodiment of the invention, energetic separation chambers are installed in parallel.

In any case, after the fulfillment of an individual cycle, the working medium, physically transformed during the cycle and condensed because of cooling, are removed through drainage system. A working medium of the given particular individual cycle, having proceeded through the stages of cooling and condensation, is removed as a liquid through drainage system. The design of a suitable drainage system is known and routine in engineering decisions, generally: a system of liquid drains tap, filtration, separation, orificing, bypass valves, dehydration box—store for recycling etc. It is possible, that some part of the condensed working medium, that has not had time to flow down from walls of chambers, will be transformed in the subsequent cycle of heating and cooling.

In another embodiment, part of the exhaust gases, are not condensed at cooling, and are discharged as a gas through a tap system for the non-condensed part of exhaust gases. The design of a suitable tap system is routine in engineering and may consist, generally, of gas chockers and gas-dynamic locks, valves, resonators, mufflers, connecting pipes etc. The major functions of the tap system consists in the closure of the volume of the common thermodynamic system with the purpose of prevention of the entry of gas from atmosphere at the moment of vacuum action and the free discharge of the exhaust gases out of the swirl chamber into the atmosphere. Thus, a single closed volume is conditionally-closed at any stage of the cycle, after the termination of which, as a rule, an alignment of pressure of the closed system with atmosphere occurs, for example at the moment of valves overlapping.

It is necessary to note, that in different operating modes, the combination of both ways and systems in the time of operation is possible.

As a result of this, the condensation of a working medium results in creation of stable and considerable vacuum in the closed volume of the single thermodynamic system defined by the ICE and the swirl chamber. It is known, that a vacuum is a state of gas at less than atmospheric pressure. It is necessary to note, that in this case a true, steady vacuum is created, as a state of gas at low temperatures. In addition, vacuum is not simply the wave underpressure formed in the exhaust process. The existence of the given vacuum in time exists at least for the period of stabilization of thermodynamic parameters of system for a particular circular thermodynamic cycle. Thus, depending on the particular ICE and its adjustments, it is possible for some residual vacuum in the closed volume defined by the ICE and swirl chamber to continue into the subsequent cycle. Thus, some change of the thermodynamic parameters of the single system is possible. In another embodiment, the alignment of the vacuum with the pressure of the external environment may be performed after a cycle is completed, for example, at the time that the ICE valves overlap or through a tap system for removing the non-condensed part of the exhaust gases.

Consequentially, the engine makes a positive power stroke, as a vacuum engine.

It is necessary to note, that the term "vacuum engine" means, first, that the device as has an expansion chamber and a working medium, and is capable of making some stroke or movement at the expense of forces created by the action of a vacuum. As the result of these forces, the positive work is produced. Thus, this engine can transfer work from a working medium to its consumers. The elementary example of such device is a piston machine. At the creation of vacuum in the top part of the cylinder, the piston makes a positive power stroke from BDC to TDC. Thus, if the piston is connected through a crank mechanism to a power shaft, then the power can be transferred to consumers.

Other examples of such devices can be various gas-turbine, turboshaft systems, rotary-piston systems (such as Wankel's), systems with spiral rotors (such as Lischolm's) and other known devices.

It is necessary to note, that any ICE has a volumetric expansion chamber and, as a rule, if it is a cyclic process, the chamber can simultaneously carry out the functions of expansion device, in one stroke, and of vacuum engine, in the other stroke.

However, it does not mean, that the invention is limited to this. The ICE according to the given invention may have an expansion chamber and a vacuum engine as separate devices structurally combined within a single engine. Thus, the engineering performance of the vacuum engine is possible, as a rule, at the expense of the difference of pressure between the atmospheric pressure of environment and the vacuum inside the closed volume in a cycle.

In this manner, the new qualitative parameters of thermodynamic cycle of ICE, as a thermal machine, are achieved.

It is necessary to note, that the Carnot cycle consists of two adiabats and two isotherms. The design of adiabatic processes does not represent specific difficulties for practical purposes. A deviation of real adiabatic processes of expansion and the compression from the isentropic curve caused by irreversibility of processes of flow, certainly, result in reduction of thermal efficiency of the cycle; however, this reduction is not too great. Research into ideal thermodynamic cycles for ICE has shown that the amount of heat input extraction, the basic parameters of state in distinguished points of a cycle, and the thermal efficiency of a cycle relate to the number of definable values.

An internal combustion engine represents such a thermal machine, in which heat input to a working medium is carried out at the expense of the burning fuel inside the engine. The working medium in such engines at the first stage is air or mixture of air with easily inflammable fuel, and at the second stage the products of combustion of this liquid or gaseous fuel. Taking into account, that the most volumetrically significant part of a working medium, according to the invention, are namely products of combustion, water and carbon dioxide, and their transformation, then it is necessary to determine the following.

The primary preparatory steps and systems of engines are standard and not changed within the frame of the offered invention. In this connection, according to the physical essence of cyclic processes, three basic kinds of piston engines cycles of internal combustion are distinguished: the Otto cycle (combustion at a constant volume); a Diesel engine cycle (combustion at constant pressure); Trinkler-Sabate cycle (combustion at a constant volume and then at a constant pressure).

Generally, the idealized closed cycle is thermodynamically equivalent to Otto cycle, consists of two adiabats (adiabat of compression 1-2 and adiabat of expansion 3-4) and two isochors (isochor of heat input 2-3 and isochor of heat extraction 4-1). The work, made by the engine in one cycle, is represented by the area 2-3-4-1-2.

Generally, as it is visible from this diagram, the idealized cycle of a Diesel engine consists of two adiabats (adiabat of compression 1-2 and adiabat of expansion 3-4), isobar 2-3, on which the heat input q1 is carried out from a hot source, and isochor 4-1, on which the heat extraction q 2 to a cold source is carried out.

One kind of "a hybrid" of Otto and Diesel engine cycles is the mixed combustion cycle, or the Trinkler-Sabate cycle. In the working cylinder the air is compressed adiabatically at the expense of the inertia of a flywheel sitting on the engine shaft, the air thus being heated up to the temperature ensuring the ignition of liquid fuel, which is submitted into an antechamber (process 1-2). The form and arrangement of the antechamber promote the best mixture of fuel with air; therefore there is a fast combustion of a part of fuel in a small volume of the antechamber (process 2-5). Due to the increase of pressure in the antechamber the mixture of the unburned fuel, air and products of combustion formed in the antechamber forces its way into the working cylinder where delayed burning of the remaining fuel occurs accompanying with the movement of the piston from the left to the right at approximately constant pressure (process 5-3). Upon termination of fuel combustion the further expansion of products of combustion (the power stroke) occurs adiabatically (process 3-4), then the exhaust gases discharge from the cylinder (process 4-1). Thus, in a cycle with mixed combustion heat input is carried out at the beginning along an isochor, and then along an isobar.

Reasoning from the given physical concepts, it is necessary to explain the thermodynamic cycle according to the invention. First, the given cycle is aggregative-phase. That is, the working medium in the course of input or heat extraction processes passes critical points of phase transition and for some time passes in the following boundary aggregative state. Such transitions, at the beginning, occur during significant heating in a whirlwind zone as a result of which the working medium undergoes a transition to a weakly ionized gas in an aggregative state with irreversible physical-chemical transformations of its chemical components. Further on, recombination with a paraxial flow and significant cooling occurs. Moreover, a condensation of chemical components of the working medium takes place during the cooling. That is the process of phase transition from gaseous state to a liquid. Accordingly, in the thermodynamic processes of the invention, aggregative-phase transitions are accompanied by changes of heat and specific volume of a working medium of the given thermodynamic system.

According to the invention, boundary temperature and phase states exist as well.

In one of the embodiments of the operating method of the invention, the temperature is sufficient to ionize only a part of the chemical components of the gas. This mode, as a rule, is transitive and in the designed thermodynamic system containing the ICE and swirl chamber can arise only in certain operating modes of the ICE, for example during warming-up. At the same time, it should be taken into account, that the physical-chemical processes of transformation of a working medium can occur with some deviations.

In addition, in another embodiment of the operating method a similar mode is possible in a low-temperature zone. So only a part of the chemical components of an ICE working medium may be subjected to condensation. In this case the non-condensed part of ICE exhaust gases, as working medium, are discharged through a system specially designed for it.

Also, in another possible operating method, the thermodynamic parameters of system are established such that ionization does not occur in the high temperature zone. Thus, the thermodynamic system is adjusted exclusively for the phase transition from a state of heated up gas to the liquid state. Here are even parts of chemical making elements of a working medium.

The process of cooling of an ICE working medium to the solid state is also possible, but as liquids are poorly compressed, the reduction of their volumetric share in the closed volume is insignificant and does not produce any significant effect on the creation of a vacuum.

The processes inside such thermodynamic system are very complex, and at the given stage of experimental research have not been studied. In this connection, the simultaneous existence of all the specified operation modes is most probable, depending on the power settings.

Figure 1:
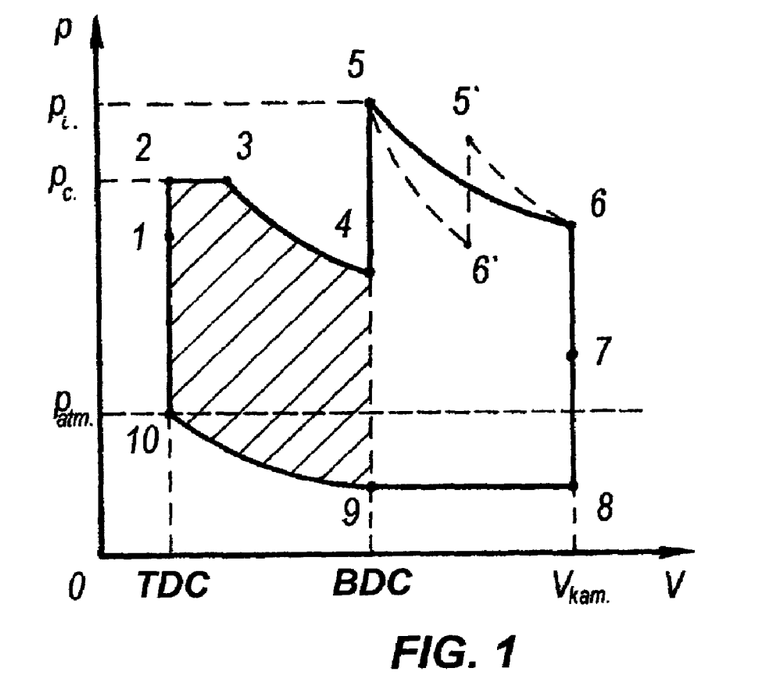
FIG. 1 is a diagram in p-V coordinates of the aggregative-phase thermodynamic cycle of the invention.

In FIG. 1 the aggregative-phase thermodynamic cycle of the invention is represented in p-V coordinates. The given cycle represents the idealized cycle of the appropriate display diagram for a unit of weight of a working medium. Physically, the given cycle is the ICE combined cycle, as a heater; with a cycle of the swirl chamber, as a refrigerating unit. The thermodynamic essence of the process consists, thus, in the fact that products of fuel combustion act not only as a heating agent, but also as in a refrigerator. Accordingly, the aggregative-phase transitions of the working medium of the engine are accompanied by changes of specific volume and changes of internal heat of the thermodynamic system, in which a change of the aggregative state of the given working medium occurs.

Therefore, heat input at the expense of the combustion of a fuel-air mixture is carried out either along an isochor, or along an isobar, or first along an isochor, then along an isobar. That corresponds to the cycles of Otto, Diesel and Trinkler-Sabate engines, accordingly. The initial strokes of the engine of the invention are equivalent to those of conventional engines. In the diagram, the heat input to a working medium is shown in isochoric section 1-2 and in isobaric section 2-3, with some pressure of combustion $p_c$.

Then, there is an adiabatic expansion of the working medium in the expansion chamber of the ICE, in the simplest case, in the piston stroke from a TDC point to BDC on the diagram. In FIG. 1, this corresponds to adiabatic section 3-4 which is similar to the corresponding section of diagrams of the known ICE designs.

The main differences inherent exclusively to the thermodynamic cycle of the invention follow. The swirl chamber of power expansion has its own thermodynamic parameters and its own display parameters; typically as a refrigerating unit. Thus, its thermodynamic parameters are incorporated in a single thermodynamic system with those of the ICE. Moreover, the swirl chamber carries out thermodynamic transformations on the same working medium, which is a gas of the same weight, but now acting as the a coolant. Therefore, in the sector of the display diagram, that corresponds to isochoric heat extraction, the working medium undergoes the following significant changes compared to the standard cycle.

First, the working medium, after opening the discharge valve, and discharging at the speeds of 600-800 m/s enters into a swirl nozzle, forms a whirlwind, in which the gas is warmed up considerably, increases in pressure and moves further along the chamber. In the display diagram this sector is marked as 4-5. The corresponding sector of the p-V diagram is actually vertical, or vertical. It represents an isochoric heat input. At this time, the working medium undergoes significant physical-chemical transformations as a result of significant heating. In some embodiments, irreversible thermal-chemical reactions, dissociation, and then ionization of the working medium occur in other embodiments, only a part of the chemical components of the working medium do so. That is, in the given sector an aggregative-phase transition of gas to a state of weakly ionized gas occur. This is the top border of an aggregative-phase transition. In the first case, where there is a transition to a weakly ionized aggregative state, point 5, which corresponds to the ionization pressure $p_i$, can be higher than heat input points 2 and 3. In the case of only partial ionization of the chemical components of the exhaust gases, point 5 can be a little bit higher, lower or equal to points 2 and 3. In another embodiment, in which the exhaust gases heat up without ionization, point 5 will be equal to, or lower than the level of points 2 and 3. In addition, it is necessary to understand that the vertical position (isochority) of the isochoric input sector of heat in the diagram depends on the thermodynamic characteristics of the swirl chamber. So in particular, if, according to one of the alternatives, serially installed swirl chambers are used, point 5, will have some downstream points 5', 5", 5''' etc., each of them will correspond to a maximum point of heating in each swirl chamber.

Further, the free whirlwind, extending along the swirl chamber, gradually loses its speed of rotation, pressure, and temperature. A smooth reduction of pressure as it expands and moves along the volume of the swirl chamber.—This corresponds to adiabatic sector 5-6 in the p-V diagram of FIG. 1. In the given sector complex transformations of reverse phase transition, in particular recombination occur. Visually, in the case where there are several chambers, the corresponding sector of the diagram 5-6 will resemble a "saw" 5-6'-5'-6. In another embodiment, where the swirl chambers are installed in parallel, generally, there will be an imposing of two diagrams from two swirl chambers on point 5. As a whole, recognizing that the given diagram represents the idealized cycle, hereinafter it is possible to neglect these divergences and to consider the diagram of a cycle guided by common thermodynamic parameters of the incorporated system.

Further, a process of compensation occurs between the cold, low pressure paraxial flow and the swirling flow, which has lost pressure and temperature. It is necessary to note, that depending on adjustment of the swirl chamber of energetic separation, the given process can be smooth, or shock-like, that is occurring quickly. The p-V diagram represents the idealized cycle, in which the transient, or shock-like process of compensation is taken into account. This moment corresponds to point 6 of p-V diagram. The position of point 6 with respect to point 4 can be higher, below, or equal.

Further, the significant vacuum and low temperatures of the paraxial flow, having changed thermodynamic parameters after being compensated with the swirling flow, considerably change the temperature and pressure of the common thermodynamic system formed by the ICE and the swirl chamber. This change occurs at constant volume in an area of low pressure and low temperatures. In the diagram this corresponds to isochoric sector 6-7 which is a sector of isochoric heat extraction. That is, at this stage of the thermodynamic cycle, heat is extracted from the hot working medium.

Further, the changes in state of the working medium during the cooling reach a critical point 7, which is the point of aggregative-phase transition of gas to a state of liquid. Depending on the parameters of the system the point of phase transition 7 can be higher, lower or equal to atmospheric pressure. The given phase transition is accompanied by significant heat extraction from the working medium, i.e. heat of evaporation (condensation). The phase transition of water vapor to a liquid can also be accompanied also by volumetric dissolution of other chemical components of the working medium. Thus, additional heat extraction is also possible at the expense of absorption of these elements in water. However, at the given stage of research this effect has not been well studied.

Therefore, in spite of the fact that ICE exhaust gases are a mixture of separate chemical elements with different points of condensation, a simplified model is presented here, in which the points of phase transition are common for the entire working medium.

The aggregative-phase transition of gas to a liquid is accompanied by significant reduction of its specific volume, and accordingly, in the common thermodynamic volume there is a reduction of pressure, which is much lower than atmospheric $p_{atm}$. This creates a significant, steady vacuum. In the diagram of FIG. 1, this corresoponds to an isochoric sector 7-8. At the same time, beginning from sector 6-8, the gas is extended as much as possible and occupies all the volume of the single thermodynamic system, up to $V_{cam}$.

Further, there is a sector of isobaric heat extraction 8-9. It is necessary to note, that gas turbines, as a kind of ICE, have a similar sector of heat extraction. It is connected to the absence of exhaust cycling. For cyclic ICE, the presence of such sector of heat extraction essentially lowers the temperature border of a cycle, which increases efficiency.

There is a sector of a positive power-stroke as a vacuum engine from BDC, point 9 in the diagram of FIG. 1, up to TDC, point 10. In the display diagram this corresponds to an adiabatic sector 9-10. Thus, it is necessary to note, that the stroke of the vacuum engine is possible, as a rule, until the pressure is brought to atmospheric pressure.

Further, sector 10-1 closes the cycle. This is an isochoric sector of heat input. In a real engine a compression of a fresh charge and its ignition occur in this sector. Generally, sector 10-1 and sector 1-2 can be considered as a single sector of isochoric input of heat.

The work which is carried out by a the working medium in one cycle is that area bounded by sectors 1-2-3-4-9-10 of FIG. 1, i.e. by the maximal points of a stroke of ICE expansion machine from TDC to BDC, and is shaded in the diagram.

The performance of a particular ICE may show significant deviations from the diagram of FIG. 1. As it is necessary to note, that a number of sectors of the idealized cycle can have changes, for example of sectors 4-5, 5-6, 6-7, 7-8, 8-9 which are connected to operational adjustments of the swirl energetic separation chamber.

Generally, the display diagram of the incorporated thermodynamic system consists of heat input isochor 1-2, heat input isobar 2-3, adiabat of expansion of a working medium 3-4, isochor of heating of a working medium in a swirling flow 4-5, adiabat of expansion of a swirling flow 5-6, isochor of heat extraction up to the point of condensation 6-7, isochor of heat extraction of condensed working medium 7-8, isobar of heat extraction 8-9, adiabat of a positive vacuum stroke 9-10, and isochor of initial heat input 10-1. Thus, the given display diagram is original, interdependent and sufficient for the description of the offered aggregative-phase thermodynamic cycle.

At the same time, distinctive features of the display diagram of the offered aggregative-phase cycle are due to the presence of two incorporated thermodynamic systems: ICE, as a heater; and swirl chamber, as a cooler.

The aggregative-phase cycle includes the joint thermodynamic transformation of the ICE working medium, with aggregative-phase transitions. The state of the working medium change in a range from ionized (partially ionized) gas, in one of the embodiments, up to completely condensed, in another embodiment, and up to the partially condensed working medium in a third embodiment of the invention. This results in changes of the top and bottom temperature border of a thermodynamic cycle. The given transformation is accompanied by changes of amount of input and extracted heat. Thus, the amount of the extracted heat is significant, and totally consists of heat extracted during the cooling of gas; heat of evaporation (condensation), and in a number of cases, the heat of dissolution (absorption). Therefore, taking into account a significant decrease of temperature of a working medium because of aggregative-phase transition in a liquid, the bottom temperature border of a cycle decreases. Moreover, according to one of the embodiments of realization of the invention, in a number of modes the increase of the top temperature border of a thermodynamic cycle is possible. According to the Carnot theorem, it leads to the increase of ICE thermal efficiency. As it is visible from the diagram in FIG. 1, the area corresponding to the amount of useful work, in comparison with a standard cycle, is considerably increased.

Also, the ecological characteristics of the ICE are improved: only a small amount of exhaust gases are discharged, in one embodiment; in another embodiment exhaust gases are not present, as they discharge as a liquid substance into a box for removing water. Also, taking into account additional increment of ICE capacity due to an additional vacuum stroke, the operational parameters of the ICE are increased; and the smoothness of its operation is increased. Also, the exhaust noise, heat and vibroload etc. are reduced. So the general positive effect of the offered invention is achieved.

Also, according to the given method, there are also other indirect, accompanying and integral positive results. For example, as a result of general cooling of the working medium inside a single system, the inner walls of the ICE combustion chamber are cooled. As a result of this, the regular cooling system operates under a smaller load.

The given invention, as an operating method, is mostly focused on cyclic engines, as these are the simplest ones to adapt and the most widespread. Various types of engines are known; two and four—stroke petrol with spark ignition and diesel engines of various designs, engines with a piston, rotary-piston, free—piston etc., and compounded systems. At the same time, the operating method, as a changed thermodynamic cycle, has wider general engineering and physical importance. In this connection, it is possible, that other types of internal combustion engines can be made in accordance with the operating method of the invention, for example, such as gas turbine, liquid jet engine, or their constructive elements in various embodiments.

Thus, the consecutive and interconnected change of thermodynamic parameters of an exhaust gas, as the ICE working medium, as a result of energetic separation in the swirl chamber which is interconnected in a single thermodynamic system with an ICE to form a single closed volume, results in a change of the ICE thermodynamic cycle, as an operating method for the engine. At the same time, under the sequential influence of significant high and low temperatures, the working medium undergoes aggregative-phase changes. At the top temperature border, all exhaust gases are ionized, in one embodiment; in another embodiment, part of the exhaust gases are ionized. At the bottom temperature border, all exhaust gases condense within the closed volume, in one embodiment; in another embodiment, part of the exhaust gases condense. Accordingly, any phase transition is accompanied by changes in the internal heat of the thermodynamic system and changes of specific volume of the working medium. The condensation of the working medium results in the creation of a steady and significant vacuum in the closed common thermodynamic volume. This is what makes a new set of characteristics possible, as a result of which an additional positive power-stroke by the ICE expansion chamber is created as in a vacuum engine.

Thus, the given sequence creates interrelated parametral attributes necessary to achieve the aggregative-phase thermodynamic cycle of the invention, leading to a physical embodiment of an ICE and an engine operating method. The basic differences from analogues, both in the method of operating, and in the device itself, consist in this.

Other engineering solutions, containing the distinct attributes of the invention are not known, and so the present invention is novel and inventive.

BRIEF DESCRIPTION OF DRAWINGS

Different embodiments of an engine having the thermodynamic cycle of the invention are shown in FIGS. 2, 3, and 4.

BEST MODE FOR CARRYING OUT THE INVENTION

An example of a device for the achievement of the specified technical effect is a four-stroke piston one-cylinder internal combustion engine. This does not represent all possible technical alternatives of the engine and the offered operating method of the invention, but only demonstrates a simple embodiment that has the essential features of the invention.

Figure 2:
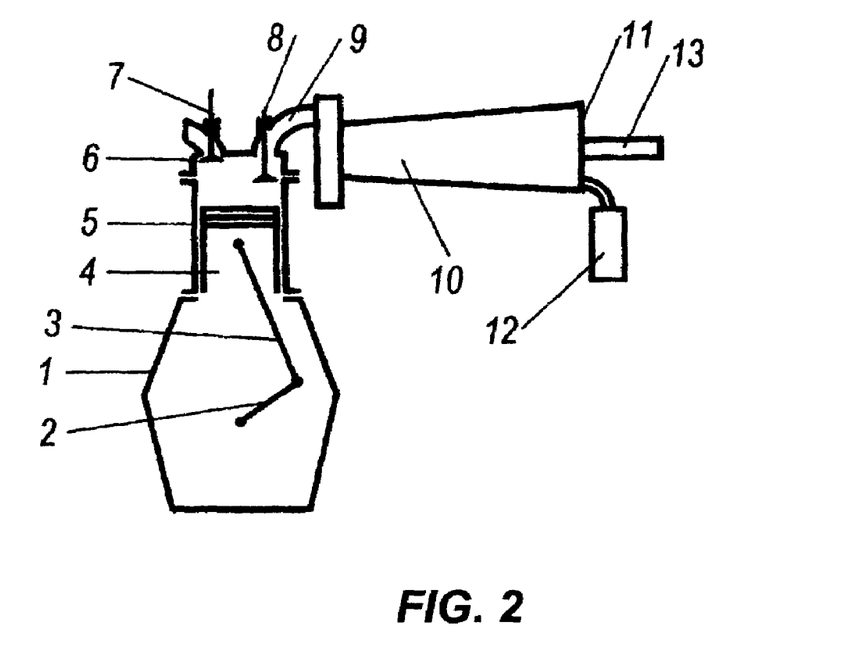
FIG. 2 shows a basic embodiment of the engine incorporated with a swirl energetic separation chamber to form a in the single closed thermodynamic system with a drainage system and a discharge system for a non-condensed part of the exhaust gases.

The basic details of the engine are crankcase 1, inside of which is mounted a crank group consisting of crankshaft 2, connecting rod 3 and piston 4, which makes a reciprocating motion within cylinder 5. In a cover (head) 6 the intake valve 7 and exhaust valve 8 with the appropriate drive systems are mounted. The swirl energetic separation chamber 10, the design of which is known (tangential nozzle and pipe) is tightly and rigidly attached to the flange of exhaust manifold 9. The swirl chamber, as a functional element of the common thermodynamic system, has the dead closed wall 11, fixing the total volume of the system from the back part of the swirl chamber. At the same time, depending on performance alternatives, drainage system 12, or, an additional tap system 13 for removal of any non-condensed component of the exhaust gases, are installed in the swirl chamber.

Figure 3:
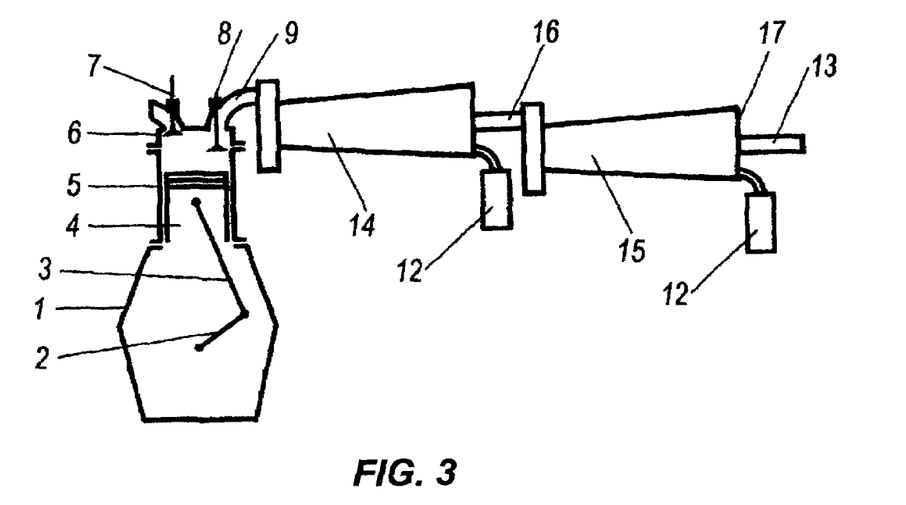
FIG. 3 illustrates another embodiment of the invention with serially installed swirl energetic separation chambers.

In another embodiment, a similar engine has two swirl chambers 14 and 15 serially installed, one after another, the primary swirl chamber being indicated by reference numeral 14, and the secondary swirl chamber being indicated by reference numeral 15. In addition, the secondary chamber is attached to the primary one through flange 16 and has the dead closed wall 17. As in the swirl chamber in the first embodiment, the system of serially installed swirl chambers has drainage system 12 and tap system 13 for removal of any non-condensed part of the exhaust gases.

Figure 4:
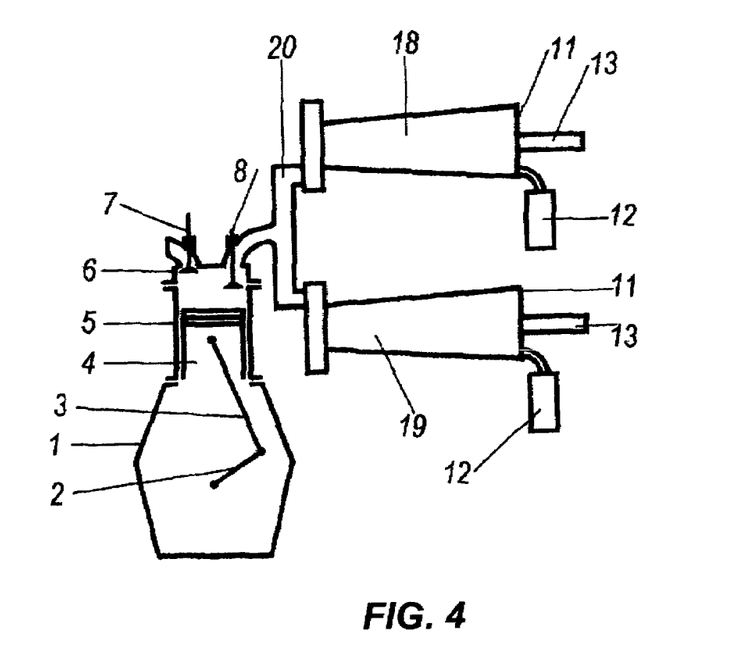
FIG. 4 illustrates another embodiment of the invention with parallel installed swirl energetic separation chambers.

In another embodiment, a similar engine has parallel installed swirl energetic separation chambers 18 and 19, installed on a common collector 20. Thus, each chamber has similar dead closed walls 11, drainage system 12 and tap system 13 for removal of any non-condensed part of the exhaust gases, similar to the system in the first embodiment.

The engine operates as follows. Fuel and air, necessary for its combustion, are taken in through the intake valve 7 in the volume of the cylinder of the engine, limited by the cover bottom 6, walls of the cylinder 5 and the bottom of the piston 4. This defines the expansion volume of the reciprocating ICE. The gases, formed at the combustion having high temperature, press on the piston 4 and move it in the cylinder 5. The forward movement of the piston 4 through connecting rod 3 is transferred to the crankshaft 2 in crankcase, which will transform it into rotary movement. At the given stage, the positive power-stroke is made directly at the expense of forces from the expansion of gas at the movement of the piston from TDC to BDC.

At this stage or cycle, as well as in the earlier preparatory process cycles, i.e. intake of the fuel—air mixture, its compression, ignition and expansion, the ICE of the invention operates similarly to the majority of four-stroke internal combustion engines of known designs.

The basic differences of operation of the given ICE start in the exhaust stroke (cycle). At the moment of opening of exhaust valves 8, the exhaust gases, having significant pressure and temperature, with speeds close to the speed of sound, enter through a collector 9 to the swirl energetic separation chamber 10, or alternatively into swirl energetic separation chambers 14 and 15, or alternatively into swirl energetic separation chambers 18 and 19. The exhaust gases pass through the swirl nozzle, and form a whirlwind along the walls of the chamber. At the same time, the discharge increases the speed of the discharge up to supercritical, and its temperature and pressure increase. Exhaust gases, because of significant heating in the whirlwind zone, undergo irreversible physical-chemical transformations. Because of the influence of the swirling flow, a paraxial flow having low pressure, and low temperature is formed inside the chamber. In some volume of the swirl chamber a braking of the swirling flow of exhaust gases occurs. As a result of this, an alignment, mutual compensation of the thermodynamic parameters of the swirling and axial flows occurs. At the same time, a significant cooling of the exhaust gas occurs. When cooling, the chemical components of the exhaust gas are condensed, i.e., they pass in aggregative-phase state of a liquid. The most significant exhaust gases—that can condense are water vapor and carbon dioxide if one takes into account the normal stoichiometric parameters of a fuel-air mixture. Taking into account, that such change of volumetric parameters of the given weight of gas occurs, in a closed volume, or in another embodiment a conditionally closed volume, of a common thermodynamic system, this results in a significant pressure reduction which—results in the creation of a significant, steady state of vacuum. Taking into account, that the given ICE has a piston and an expansion chamber connected to the swirl chamber to form a single volume, then inside the cylinder 5 the same vacuum is formed. Taking into account, that inside ICE crankcase 1 there is some total pressure (generally, atmospheric pressure and the pressure of crankcase gases), then as a result of such difference of pressure, the piston 4 makes an additional positive power-stroke from BDC to TDC, as a vacuum engine.

Drainage system 12 and tap system 13 for removal of the non-condensed part of the exhaust gases-recycle the working medium from the common thermodynamic system after the completion of a cycle and represent engineering decisions.

In one of the ICE embodiments, FIG. 3, the swirl energetic separation chambers 14 and 15 are installed serially. Such a construction option allows the common thermodynamic system to be adjusted more precisely. Therefore, for example, in the primary chamber more heating can be accomplished, and in the secondary one, more cooling can be accomplished. As a rule, as a minimum two serially installed chambers will allow this. As a rule, the last of the chambers can have the drainage system and the tap system for removing the non-condensed part of the exhaust gases.

In another embodiment, FIG. 4, the swirl energetic separation chambers 18 and 19 are installed in parallel. Such decision allows one to adjust the system more precisely, since the throughput capacity of the swirl nozzles is increased, and gas lock-out in the ICE exhaust flange is thereby prevented. As a rule, there will be a minimum of two parallel installed chambers. As a rule, each chamber can have a drainage system and a tap system for removing the non-condensed part of the exhaust gases.

Thus, the present invention is the interconnected combination of an ICE and a swirl chamber for energetic separation of the exhaust gas in a single thermodynamic system with interdependent thermodynamic parameters. Because of this design, the significant thermodynamic transformations of the ICE exhaust gas are carried out, resulting in a cooling and condensation of the exhaust gases in the closed volume, and formation of a vacuum and an additional ICE positive power-stroke, like a vacuum engine. The technical result is the achievement of a new operating method. This also represents the basic difference between the ICE of the invention from the closest art.

The result is the increase of the efficiency of the engine and the increase of useful work, which is due to the creation of a vacuum (travel of the piston). The ecological characteristics of the engine are also improved. During the operation of the engine in the cycle of the invention, the crankshaft stroke is steadier, which is favorably reflected in the operation of a mechanism connected to the engine.

INDUSTRIAL APPLICABILITY

The offered aggregative-phase thermodynamic cycle, as an operating method, is carried out on the basis of the known designs of internal combustion engines. Structurally, the technical embodiments of the offered internal combustion engine are based those known in exhaust engineering and technology. The engine of the invention does not require significant alteration of an ICE design, and corresponds to the level of usual worldwide service infrastructure. In operation the engine does not require new fuel and consumes fuel more economically. This confirms the opportunity of commercial applicability of the invention.

We claim:

1. An operating method for an internal combustion engine, representing a closed thermodynamic cycle that includes steps of isochoric, isobaric heat input during combustion, adiabatic expansion of gases, isochoric heat removal at the moment of their discharge and adiabatic compression, wherein the internal combustion engine and a swirl energetic separation chamber (10) incorporate a single interdependent thermodynamic system with a single closed volume, comprising the steps of:

a) discharging exhaust gases through a tangential nozzle into the swirl energetic separation chamber (10) of the internal combustion engine to form a swirling gas flow within the swirl energetic separation chamber such that b) the swirling gas flow in the swirl energetic separation chamber separates into a cold paraxial flow with low pressure and a hot swirling flow with high pressure, wherein in the hot swirling flow the exhaust gases are heated up and make irreversible physical-chemical transformations, wherein chemical components of the exhaust gases undergo an aggregative-phase transition, c) compensating and cooling said hot swirling flow through contact with the cold paraxial flow with transformation of common thermodynamic and physical-chemical parameters of the exhaust gases, wherein an aggregative-phase transition of chemical components of the exhaust gases into a state of liquid occurs d) subsequently removing the liquid into a drainage (12); and e) producing vacuum in the closed volume of the single thermodynamic system and making an additional positive power stroke in the expansion chamber of the internal combustion engine as a vacuum engine.

2. An operating method as described in claim 1, wherein in step b), chemical components of the exhaust gases undergo an aggregative-phase transition into a state of ionized gas.

3. An operating method as described in claim 1, wherein in step b), the exhaust gases are heated such that the chemical components of the exhaust gases undergo a partial ionization.

4. An operating method as described in any of claims 1, 2 or 3, wherein in step c) the exhaust gases are cooled such that the chemical components of the exhaust gases partially condense.

5. An internal combustion engine, representing a closed thermodynamic cycle that includes steps of isochoric, isobaric heat input during combustion, adiabatic expansion of gases, isochoric heat removing at the moment of their discharge and adiabatic compression;

wherein the internal combustion engine device comprises;

a swirl energetic separation chamber (10), incorporating a single interdependent thermodynamic system with a single closed volume;

means for discharging exhaust gases into the swirl energetic separation chamber (10) of the internal combustion engine through a tangential nozzle such that the discharged exhaust gasses form a swirling gas flow within the swirl energetic separation chamber such that the swirling gas flow separates in the swirl energetic separation chamber into a cold paraxial flow with low pressure and a hot swirling flow with high pressure, wherein in the hot swirling flow the exhaust gases heat up and make irreversible physical-chemical transformations, wherein chemical components of the exhaust gases undergo an aggregative-phase transition;

means for compensating and cooling said hot swirling flow through contact with the cold paraxial flow with transformation of common thermodynamic and physical-chemical parameters of the exhaust gases wherein an aggregative phase transition of chemical components of the exhaust gases into a state of liquid occurs, producing a vacuum in the closed volume of the single thermodynamic system and making an additional positive power stroke in the expansion chamber of the internal combustion engine as a vacuum engine;

means for subsequently removing the liquid into a drainage (12).

6. The engine as described in claim 5, wherein, said drainage system (12) is adapted for removal of the used condensed working medium of the engine.

7. The engine as described in claim 5 or 6, further comprising an additional system (13) for the removal of non-condensed gas constituent of used working medium of the engine.

8. The engine as described in claim 5 or 6 comprising serially installed swirl energetic separation chambers (14, 15), forming an interdependent thermodynamic system.

9. The engine as described in claim 5 or 6 comprising parallel installed swirl energetic separation chambers (18, 19) forming an interdependent thermodynamic system.

10. An operating method for an internal combustion engine, wherein the internal combustion engine includes a swirl energetic separation chamber (10) and the internal combustion engine and swirl energetic separation chamber together form a single interdependent thermodynamic system with a single closed volume, comprising the steps of:

a) discharging exhaust gases from the internal combustion engine through a tangential nozzle into the swirl energetic separation chamber (10) to form a swirling gas flow within the swirl energetic separation chamber such that the swirling gas flow in the swirl energetic chamber separates into a cold paraxial flow with low pressure and a hot swirling flow with high pressure, such that the hot swirling flow of exhaust gases are heated up and undergo irreversible physical-chemical transformations, b) mixing the cold paraxial flow and hot swirling flow in the swirl energetic separation chamber such that at least a portion of the hot swirling flow of exhaust gases is cooled and condenses to a liquid, thereby forming a vacuum in the swirl energetic separation chamber and in the internal combustion engine, c) whereby said vacuum produces at least one additional power stroke, and d) subsequently removing the liquid into a drainage (12).

11. The method of claim 10, wherein the internal combustion engine is a 4-stroke piston type engine having at least one cylinder.

12. The method of claim 11, wherein the vacuum formed in step b) produces a vacuum in at least one cylinder of the internal combustion engine.

13. An internal combustion engine, wherein the internal combustion engine comprises;
- means for discharging exhaust gases from at least one cylinder of the internal combustion engine into a swirl energetic separation chamber (10);
- a swirl energetic separation chamber (10), which forms a single interdependent thermodynamic system with the internal combustion engine, and wherein the swirl energetic separation chamber includes (a) a tangential nozzle for introducing said discharged exhaust gases into the swirl energetic separation chamber to form a swirling gas flow within the swirl energetic separation chamber such that the exhaust gases separate in the swirl energetic separation chamber into a cold paraxial flow with low pressure and a hot swirling flow with high pressure, such that the exhaust gases of the hot swirling flow are heated, undergo irreversible physical-chemical transformations and become capable of undergoing an aggregative phase transition and (b) means for mixing the hot swirling flow and the cold paraxial flow such that at least a portion of the hot swirling flow of exhaust gases is cooled and condenses to a liquid, thereby forming a vacuum in the swirl energetic separation chamber and in the internal combustion engine; and
- means for subsequently removing the liquid into a drainage (12).

14. The internal combustion engine of claim 13, which is a 4-stroke piston type engine having at least one cylinder.

15. The internal combustion engine of claim 14, wherein the swirl energetic separation chamber is adapted to produce a vacuum in at least one cylinder of the internal combustion engine.

* * * * *